March 30, 1943.　　　C. DORNIER　　　2,315,110
CONTROL APPARATUS FOR AIRCRAFT
Filed Sept. 14, 1939　　　3 Sheets-Sheet 1
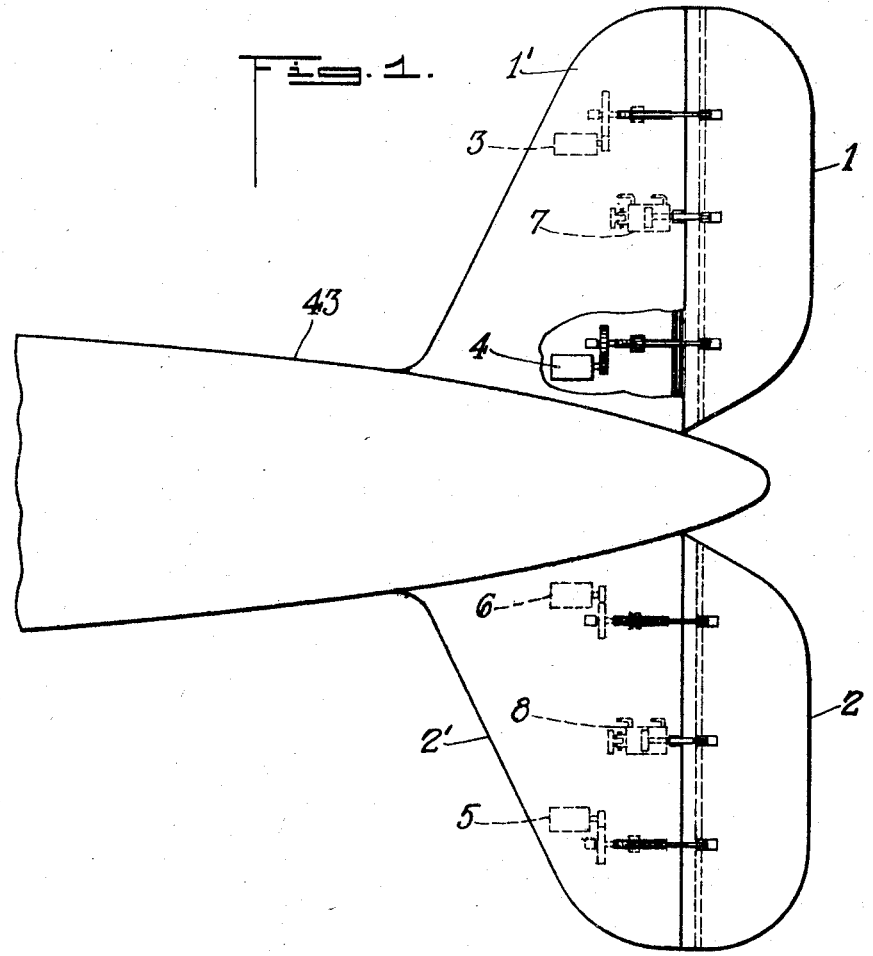
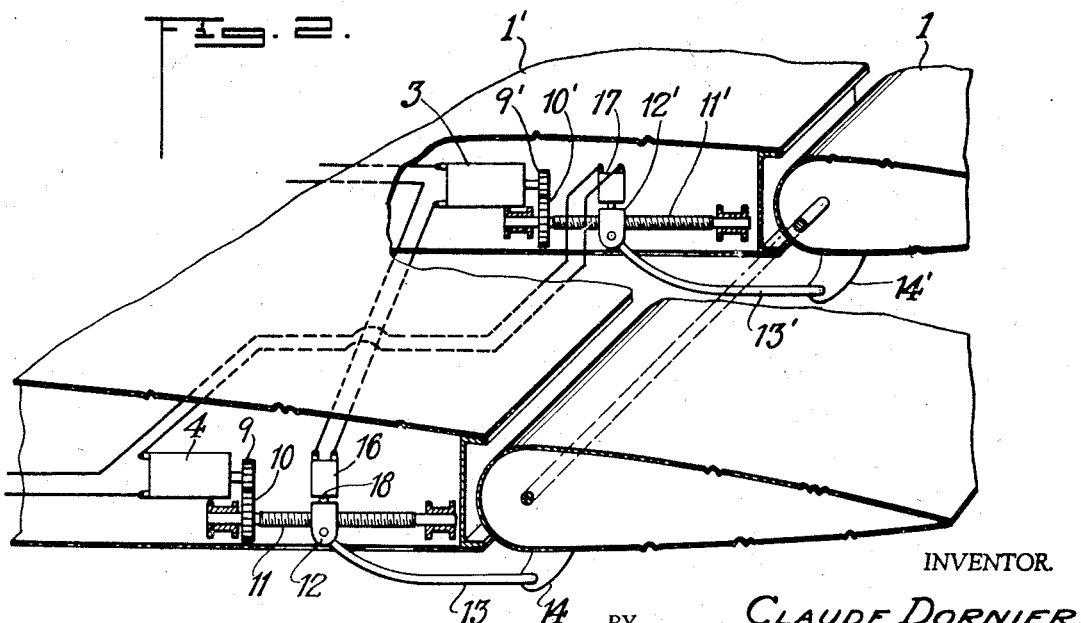
INVENTOR.
CLAUDE DORNIER.
BY Karl A. Mayr.
ATTORNEY.

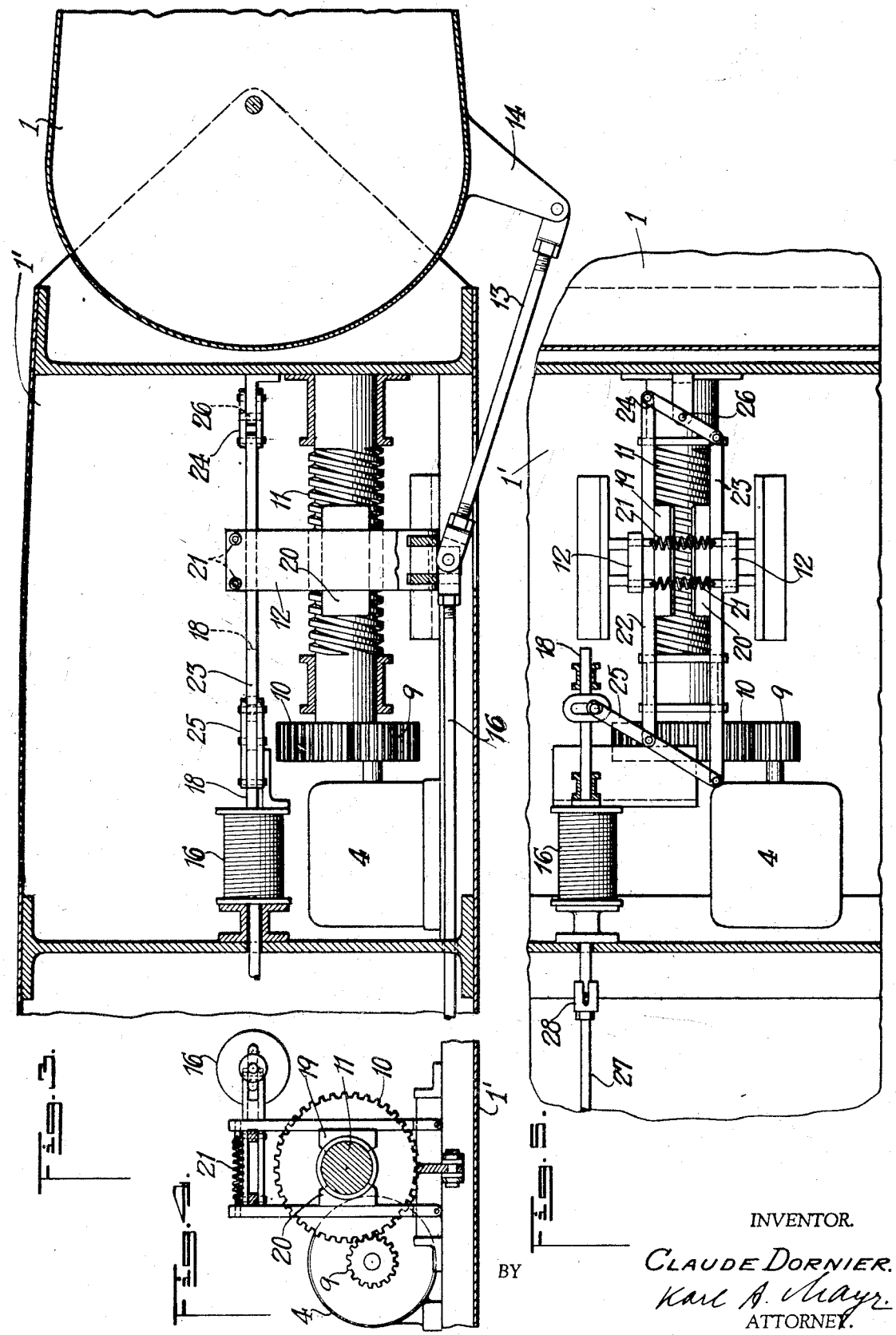

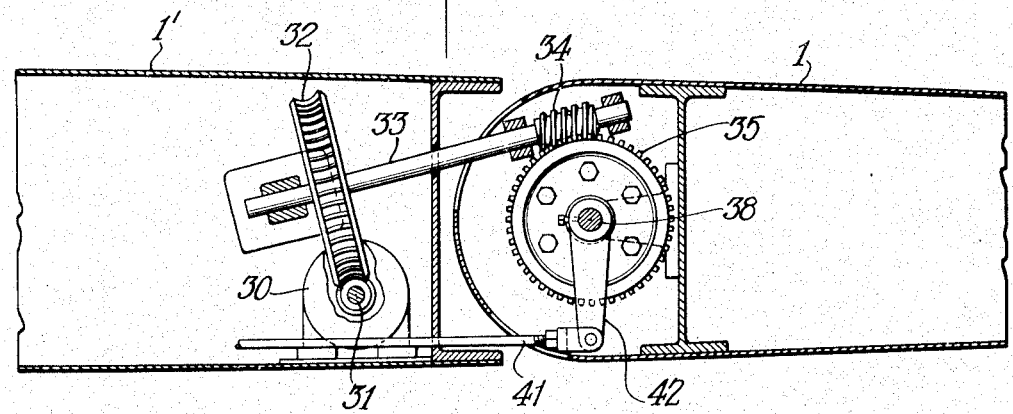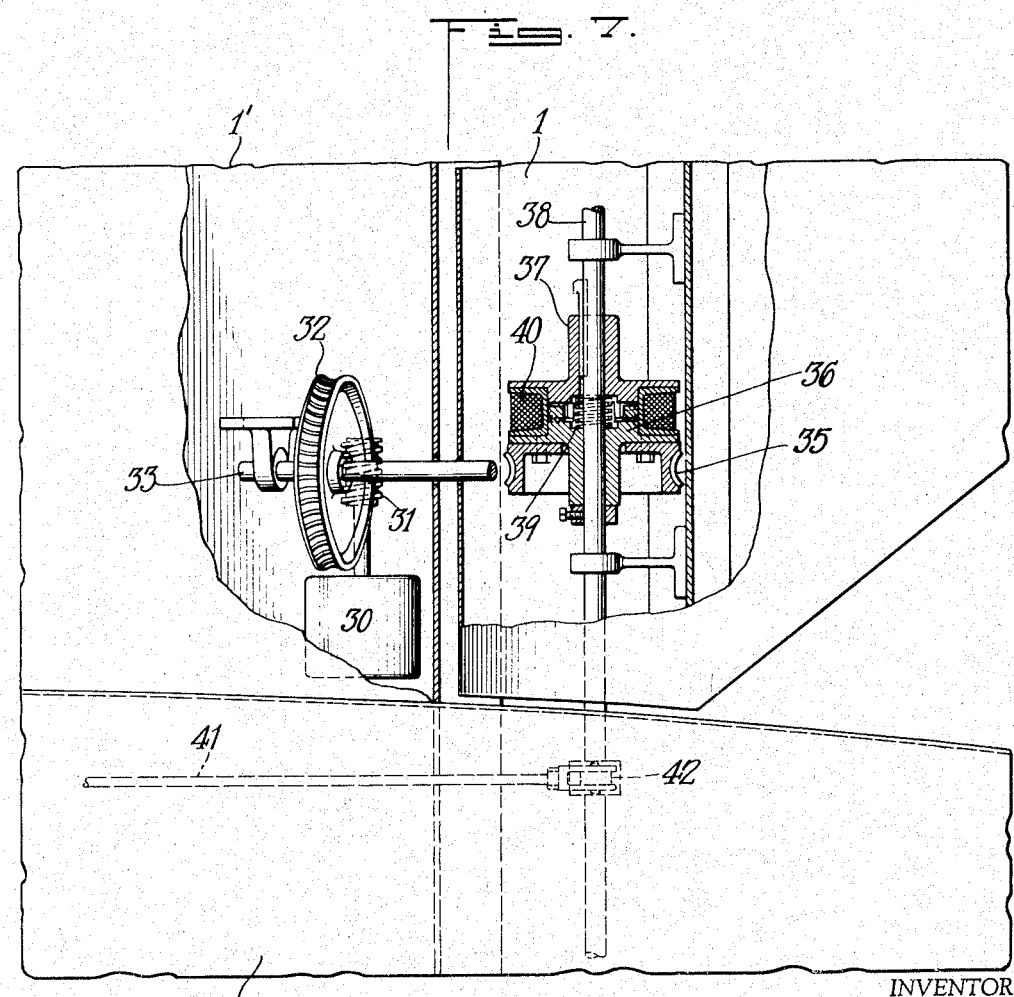

Patented Mar. 30, 1943

2,315,110

UNITED STATES PATENT OFFICE 2,315,110

CONTROL APPARATUS FOR AIRCRAFT

Claude Dornier, Friedrichshafen-on-the-Bodensee, Germany; vested in the Alien Property Custodian Application September 14, 1939, Serial No. 294,923
In Germany September 14, 1938

3 Claims. (Cl. 244—83)

The present invention relates to a power drive for aircraft elevators and/or rudders, more particularly to a drive as set forth which assures reduction of vibrations caused by air current to a low and harmless value.

It has been proposed to reduce the power required to operate rudders, elevators and the like in large aircraft so that they could be moved by the hand of the pilot, by the provision of auxiliary rudders whereby air pressure was used to assist operation of the main rudders and the like. With such conventional arrangements the efficiency of the aircraft is considerably reduced.

Self locking worm gears were used in order to prevent creation of dangerous vibrations. These gears prevented transmission of vibrations to the manipulating end of the control apparatus but did not eliminate vibration of the rudders or flaps themselves.

It is an object of the present invention to provide a construction and mechanism which obviates the disadvantages inherent to the conventional mechanisms. According to the present invention each individual rudder or flap and the like is driven by at least two motors. These motors which are preferably of the electric type are disposed immediately adjacent to the rudder, for example, in the part of the wing, elevator fin or rudder fin which is adjacent to the flap to be operated. Provision of the otherwise needed heavy control rods etc. is thereby made unnecessary. The power of each driving motor is transmitted by means of a motion checking gear to the flap whereby major vibrations of the flap are made impossible. Minor vibrations due to elastic deformation of the construction elements between the point of attack of wind pressure and the point of attack of the flap operating force are reduced to a harmless value with the multi-drive according to the present invention by the reduction of the distance between said points of attack. Vibrations are further reduced by the provision of conventional mechanical or hydraulic dampers.

It is an object of the present invention to provide a control mechanism as set forth above in which electromotors are used which operate on independent power circuits. In case one motor and/or circuit is incapacitated the aircraft can be steered at least temporarily by means of the other motor and power circuit. According to the present invention the lock caused by the worm gear associated with the incapacitated motor is automatically put out of action.

In case all of the electric drive is incapacitated at first the lock associated with the last incapacitated motor is released by means of an emergency lock release mechanism and afterwards an emergency hydraulic or mechanical actuating mechanism is set into operation which may be disposed in between the electric motors and which is completely independent from the electric drive. An additionally provided mechanical or hydraulic damping device supplements the emergency actuating mechanism.

Further and other objects and advantages of the present invention will be apparent from the accompanying specification and claims and shown in the drawings which, by way of illustration, show what I now consider to be preferred embodiments of my invention.

Figure 1 is a diagrammatic showing of the control mechanism according to the present invention as applied to elevator flaps which are seen from below.

Figure 2 is an isometric diagrammatic showing of the control mechanism according to the present invention.

Figure 3 is a part sectional large scale side view of one drive unit of a control mechanism according to the present invention.

Figure 4 is an end view of the unit shown in Figure 3.

Figure 5 is a top view of the unit shown in Figures 3 and 4.

Figure 6 is a large scale part sectional side view of a modified control unit according to the present invention.

Figure 7 is a part sectional, part isometric view of the control unit shown in Figure 6.

Like parts are designated by like numerals in all figures of the drawings.

Referring more particularly to Figure 1 of the drawings 1 and 2 are the elevators which are hinged to elevator fins 1' and 2' respectively and are each driven by two electric motors 3 and 4 and 5 and 6 respectively. The fins 1' and 2' are connected with the fuselage 43. In between each pair of electric motors an emergency drive 7 and 8 respectively is provided. This drive is completely independent from the electric power circuits and may be of the piston type and actuated by a different power medium, for example hydraulically or mechanically. Each motor operates on an independent power circuit which extends into the operator's cabin and which is not shown in Figure 1.

Figure 2 diagrammatically shows the wiring of motors 3 and 4 and solenoids 16 and 17. Solenoid 16 is in the same circuit as is motor 3, Solenoid 17 and motor 4 are both on another circuit which is independent from the first mentioned circuit. Motor 4 operates the spur gear 9, 10 and thereby the threaded spindle 11. A nut member 12 riding on spindle 11 controls the position of elevator 1 through an intermediary rod 13 which is movably connected to the projection 14 of flap 1. A similar mechanism 9', 10', 11', 12', 13', 14' is used to transmit the power of motor 3 to the flap 1.

The gears 11, 12 and 11', 12' prevent displacement of the flap 1 by wind pressure.

In order to release the locking action of gears 11, 12 and 11', 12' the nut members 12 and 12' consist each of two halves 19, 20 which are shown more clearly in Figures 3 to 5. These halves are normally pulled together to cause engagement of spindle 11 by means of springs 21 and are individually connected with the rods 22 and 23 which together with the brackets 24 and 25 form a parallelogram the configuration of which can be changed by changing the position of one of the bracket members 24 or 25. Member 24 swings about a stationary fulcrum 26 and member 25 has an extension which is movably connected with the armature 18 of the solenoid 16.

If, for example, motor 4 is incapacitated the current flow through motor 3 and solenoid coil 16 is abruptly and automatically increased and this increased current actuates the armature 18 and moves member 25 counterclockwise; the distance between rods 22 and 23 and thereby the nut member halves 19 and 20 is thereby increased and there is no engagement of said members and the spindle 11.

An emergency operating rod 16' is movably connected to the nut member 12 consisting of halves 19 and 20 so that the flap 1 may be operated by hand or other power means as soon as nut device 12 is in disengaged position.

An emergency operating mechanism comprising a rod 27 having a furcated end 28 which is movably connected with the armature 18 so that also this part of the mechanism can be operated by hand or other power means.

In Figures 6 and 7 a modification of the drive according to the present invention is illustrated. In this modification the electric motor 30 drives a worm wheel 32 by means of a worm 31. Shaft 33 of wheel 32 carries another worm 34 which cooperates with the worm wheel 35. The latter is rigidly connected with one half 36 of the electromagnetic claw coupling 36, 37. Part 36 is rotatable with respect to shaft 38. Part 37 is axially displaceably but not rotatably connected with shaft 38. Spring 39 tends to separate parts 36 and 37 so that the coupling is disengaged. As soon as the electromagnets 40 are energized part 37 is pulled onto part 36 and the coupling is engaged and the power is transmitted from motor 30 to shaft 38. Shaft 38 is the axis of rotation of flap or rudder 1 and is rigidly connected thereto. If shaft 38 is rotated the position of flap 1 is changed. The electromagnets 40 are on the same power circuit as is motor 30. If this circuit fails coupling 36, 37 is disengaged and the shaft 38 can be operated by hand or other power means by operating rod 41 which moves crank 42 which crank is rigidly connected with shaft 38.

While I believe the above described embodiments of my invention to be preferred embodiments, I wish it to be understood that I do not desire to be limited to the exact details of design and construction shown and described, for obvious modifications will occur to a person skilled in the art.

I claim:

1. A control mechanism for a steering flap in aircraft, comprising a plurality of individual self-locking power transmitting mechanisms individually operatively connected with said flap, a plurality of electric motors individually operatively connected with said power transmitting mechanisms for operating same and thereby said flap, an individual electric power circuit for each of said motors, and electromagnetic release devices individually connected with each of said power transmitting mechanisms and being individually interposed in the power circuits of said motors, said devices being adapted to be individually actuated upon failure of operation of an individual motor and to individually release said flap from said motors whereby operation of said flap independently from said motors is made possible.

2. A control mechanism for a steering flap in aircraft, comprising a plurality of individual self-locking power transmitting mechanisms individually operatively connected with said flap, a plurality of electric motors individually operatively connected with said power transmitting mechanisms for operating same and thereby said flap, an individual electric power circuit for each of said motors, and electromagnetic release devices individually connected with each of said power transmitting mechanisms, said devices being adapted to individually release said flap from said motors upon actuation of said devices, and emergency control means connected with said flap which means may be operated when said release devices are actuated.

3. In a control mechanism for an aircraft steering flap, a pair of individual self-locking power transmitting mechanisms, said mechanisms being individually operatively connected with said flap for operating same, a pair of electric motors, said motors being individually operatively connected with said power transmitting mechanisms for operation thereof, an electric current responsive release device connected with each of said power transmitting mechanisms, an individual electric power circuit for each of said motors, always one of said release devices being interposed in that one of said power circuits operating the motor connected with the power transmitting mechanism not affected by said one release device whereby the increasing electric current in one of said circuits when the motor in the other circuit fails releases the power transmission between the failing motor and said flap.

CLAUDE DORNIER.